(12) United States Patent
Uppara et al.

(10) Patent No.: US 12,516,001 B2
(45) Date of Patent: Jan. 6, 2026

(54) SPRAY COMPOSITION OF AVERSIVE AGENT

(71) Applicant: UPL LTD, Haldia (IN)

(72) Inventors: Veera Parasu Uppara, Mumbai (IN); Sanjay Pradnya Lokhande, Mumbai (IN); Ramprakash Krishna Srivastava, Mumbai (IN)

(73) Assignee: UPL LTD., Haldia (IN)

( * ) Notice: Subject to any disclaimer, the term of this patent is extended or adjusted under 35 U.S.C. 154(b) by 761 days.

(21) Appl. No.: 17/431,210

(22) PCT Filed: Feb. 19, 2020

(86) PCT No.: PCT/IB2020/051373
§ 371 (c)(1),
(2) Date: Aug. 16, 2021

(87) PCT Pub. No.: WO2020/170148
PCT Pub. Date: Aug. 27, 2020

(65) Prior Publication Data
US 2022/0127205 A1   Apr. 28, 2022

(30) Foreign Application Priority Data
Feb. 20, 2019   (IN) .............................. 201931006753

(51) Int. Cl.
C06D 7/00   (2006.01)
F41H 9/10   (2006.01)

(52) U.S. Cl.
CPC .................................. *C06D 7/00* (2013.01); *F41H 9/10* (2013.01)

(58) Field of Classification Search
CPC . C06D 7/00; F41H 9/10; A01M 29/12; A01N 25/06; A01N 25/30; A01P 17/00
See application file for complete search history.

(56) References Cited

U.S. PATENT DOCUMENTS

| | | | |
|---|---|---|---|
| 3,080,327 A | 3/1963 | Hay et al. | |
| 3,268,577 A | 8/1966 | Hay | |
| 4,652,577 A | 3/1987 | Hollander et al. | |
| 4,661,504 A | 4/1987 | Hollander et al. | |
| 5,698,180 A | 12/1997 | Dixon | |
| 5,741,553 A * | 4/1998 | Manolas ................ | A01N 61/00 106/18.32 |
| 5,891,919 A | 4/1999 | Blum | |
| 6,399,073 B2 | 6/2002 | Pinkney | |
| 6,399,109 B1 | 6/2002 | Brite et al. | |
| 6,468,554 B1 | 10/2002 | Ichino | |
| 7,531,187 B2 | 5/2009 | Jadhav et al. | |
| 2007/0071784 A1 | 3/2007 | Rakoczi et al. | |
| 2007/0071785 A1 | 3/2007 | Craven et al. | |
| 2010/0290022 A1 | 11/2010 | Butler | |
| 2012/0148520 A1 | 6/2012 | Strobel et al. | |
| 2013/0053421 A1 | 2/2013 | Walter et al. | |
| 2013/0161222 A1 | 6/2013 | Patel | |
| 2018/0235214 A1 | 8/2018 | Tortillard | |
| 2022/0046919 A1 | 2/2022 | Srivastava et al. | |
| 2022/0127488 A1 * | 4/2022 | Knight ..................... | C08K 5/20 |

FOREIGN PATENT DOCUMENTS

| | | | |
|---|---|---|---|
| BR | 102017003113 A2 | 9/2018 | |
| CA | 2941717 A1 | 3/2018 | |
| CN | 105265433 A | 1/2016 | |
| CN | 107920512 A | 4/2018 | |
| EP | 0027624 B1 | 3/1983 | |
| EP | 0173410 A1 | 3/1986 | |
| EP | 3874950 A1 | 9/2021 | |
| GB | 2213724 A | 8/1989 | |
| JP | 200255187 A | 9/2002 | |
| JP | 2008260730 A | 10/2008 | |
| WO | 9404027 A1 | 3/1994 | |
| WO | 9422299 A1 | 10/1994 | |
| WO | 0230201 A2 | 4/2002 | |
| WO | WO-2015134828 A1 * | 9/2015 | ........... C11D 17/043 |
| WO | 2016009279 A2 | 1/2016 | |
| WO | 2017202882 A1 | 11/2017 | |

OTHER PUBLICATIONS

Crosswaithe, A. et al.; "The invertebrate pharmacology of insecticides acting at nicotinic acetylcholine receptors"; Journal or Pesticide Science, vol. 42, Issue No. 3; 2017; pp. 67-83.
International Search Report and Written Opinion for International Application PCT/IB2020/051421; International Filing Date: Feb. 20, 2020; Date of Mailing: Apr. 28, 2020; 10 pages.
International Search Report and Written Opinion for International Application PCT/IB2020/052261; International Filing Date: Mar. 13, 2020; Date of Mailing: Apr. 28, 2020; 12 pages.
Sathe, T. et al.; "Biodiversity of Jassids from agroecosystems of Kolhapur district, India"; International Journal of Science, Environment, vol. 3, Issue No. 3; 2014; pp. 1053-1058.
Sparks, T. et al.; "IRAC: Mode of action classification and insecticide resistance management"; Pesticide Biochemistry and Physiology, vol. 121; 2015; pp. 122-128.
International Search Report and Written Opinion for International Application PCT/IB2020/051373; International Filing Date: Feb. 19, 2020; Date of Mailing: May 4, 2020; 10 pages.
Martin, B.; "Shaws Chew Deterrent"; Product Information available online at https://canineconcepts.co.uk/product/chew-deterrent-shaws/ [retrieved Jul. 29, 2021]; 2017; 2 pages.
Trent, A. et al.; "Comparison of Commercial Deer Repellents" United States Department of Agriculture, Forest Service; available online at https://https://www.fs.fed.us/t-d/pubs/htmlpubs/htm01242331/index.htm [retrieved Jul. 29, 2021]; 2001; 8 pages.

* cited by examiner

*Primary Examiner* — Robert A Wax
*Assistant Examiner* — Olga V. Tcherkasskaya
(74) *Attorney, Agent, or Firm* — CANTOR COLBURN LLP

(57) ABSTRACT

The present invention relates to a composition comprising bittering agent for defense against human or animal attacker. The present invention more particularly relates to a composition comprising denatonium compound for self-defense, method of making and use of said composition as a personal protectant against human or animal attacker.

6 Claims, No Drawings

SPRAY COMPOSITION OF AVERSIVE AGENT

CROSS REFERENCE TO RELATED APPLICATIONS

This application is a National Stage application of PCT/IB2020/051373, filed Feb. 19, 2020, which claims the benefit of priority to Indian Patent Application 201931006753, filed Feb. 20, 2019, both of which are incorporated by reference in their entirety herein.

FIELD OF INVENTION

The present invention relates to a composition comprising bittering agent for defense against human or animal attacker. The present invention more particularly relates to a composition comprising denatonium compound for self-defense, method of making and use of said composition as a personal protectant against human or animal attacker.

BACKGROUND OF THE INVENTION

Denatonium benzoate, also known as phenylmethyl-[2-[(2,6-dimethylphenyl)amino]-2-oxoethyl]-diethylammonium benzoate, CAS no. 3734-33-6. Formula: C28H34N2O3 molecular weight: 446.58 g/mol Denatonium benzoate is a quaternary ammonium salt formed by the combination of a cationic quaternary ammonium salt with an inert anion such as benzoate ion or saccharin anion. Having the following structure:

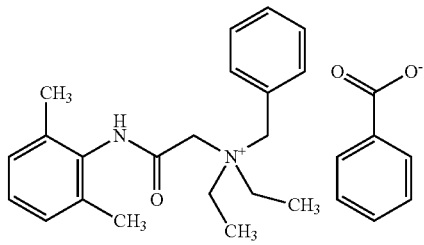 [SMILES: CC[N+](CC)(CC(=O)Nc1c(C)cccc1C)Cc1ccccc1 ; O=C([O-])c1ccccc1]

Denatonium benzoate is listed in the Guinness Book of Records and the Merck Index as "the bitterest substance known to man". Denatonium benzoate can be detected by the average person at 10 ppb and has a generally recognized bitter taste at 50 ppb. The normal application range is 6-50 ppm, depending on the nature of the product to which it is added. However, clinical trials have proven that its extremely human safe drug.

Denatonium benzoate is generally used as a aversive agent (bittering agent) to prevent eating of toxic substances. For example, added to industrial alcohol, paint, toilet cleaners, liquid soaps, and shampoos in order to prevent poisoning in people, animals. Also, For example, it can be used in a dilute solution to brush on the fingernails of people who are compulsive fingernail-biters or on the thumbs of children who suck their thumbs more than they should. Denatonium benzoate is also used as an animal repellent such as cat, dog, and bird repellents, for prevention of cannibalism in pigs, to keep horses from chewing their stalls, deer from nibbling tree shoots, and to keep hedgehogs from eating slug pellets (Payne 1988).

The use of denatonium compounds, in particular, Denatonium Benzoate and Denatonium Saccharide, as aversive agents is known in patents, viz., U.S. Pat. Nos. 3,080,327, 3,268,577, 4,661,504 and 4,652,577.

EP0173410 discloses a composition for repelling birds and other creatures comprising Denatonium benzoate as a repellant in association with a terpene or terpene polymer.

A variety of products are available commercially for defense purpose and other requirements such as chili spray or pepper spray used by females for self-defense, spray that assists in subduing and arresting people whose behavior is violent or uncooperative. When it comes to self-defense, various spray systems are effective and readily available for personal protection. However, pepper spray and capsaicin can cause permanent damage to the eye, however, prolong exposure could certainly cause permanent damage to the cornea. Similarly, chili spray is not safe for human. Thus, both chili spray and pepper spray are not safe for the human attackers.

There remains a need for alternative and effective composition used for defense against human and animal attackers.

The present inventors have surprisingly found that bittering agents when used in a composition does not cause any physical damage to the person on whom it is used and is effective for the purpose. Its inhalation will cause extreme bitterness to the person and person will be distracted instantly from the actions.

Without causing any physical damage to the attacker, aversive agent spray causes discomfort and nausea instantly. Chemical or pepper spray or Chili spray can be harmful to the person on whom it has been used. The aversive agent used herein is chemically safe and doesn't cause any physical damage to the person on whom it is being used.

OBJECTS OF THE INVENTION

It is an object of the present invention to provide a composition comprising an aversive agent.

It is another object to provide a spray composition for defense against attackers.

It is an object of the present invention to provide denatonium compounds as aversive agent for dispersing mob and curbing violent protest.

It is an object of the present invention to provide spray composition comprising denatonium compound which does not cause any physical damage to the person on whom it is used.

It is another object of the present invention to provide a method of defense using said composition which is safe to use and effective against defense by another.

It is an object of the invention to provide a composition comprising denatonium compound which is readily available and used by a person being attacked toward an attacker to provide effective defense.

SUMMARY OF THE INVENTION

In an aspect of the present invention, there is provided a composition comprising a bittering agent.

In another aspect of the present invention, there is provided a composition comprising denatonium compound as active agent for defense against attackers.

In yet another aspect of the present invention, there is provided a composition comprising denatonium benzoate.

In another aspect of the present invention, there is provided a method of deterring an attack comprising applying said composition to attacker.

The present invention is directed to a method of personal self-defense for females which is safe to use and provides an effective deterrent to a would-be assailant. In a preferred embodiment, defense method involves spraying in the direction of the assailant the composition without permanent harmful effect on skin or eyes.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about". The term "about" used to qualify the amounts of active agent shall be interpreted to mean "approximately" or "reasonably close to" and any statistically insignificant variations therefrom.

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

The terms "aversive agent" and "bittering agent" are used interchangeably and included to mean bitter substance in the specification.

As used herein, the terms "comprising" "including," "having," "containing," "involving," and the like are to be understood to be open-ended, i.e., to mean including but not limited to.

The present invention relates to a composition comprising bittering agent, used for defense.

The bittering agent is selected from natural or synthetic bitterants.

In an aspect of the present invention, there is provided a composition comprising denatonium compound for defense against attacker.

In yet another aspect of the present invention, there is provided a composition comprising bittering agent and a carrier. bittering agent is selected from natural or synthetic bitterants.

In yet another aspect of the present invention, there is provided a composition comprising denatonium compound.

The present composition further comprising a carrier selected from water, surfactant, dispersing agent, solvent, colorants, flavors, stabilizers, buffers, thickening agent, solubilizing agent or mixtures thereof.

The carrier is used in an amount of 0.1 to 50% w/v of the composition.

In an embodiment, the liquid composition comprising denatonium compound as aversive agent and a carrier.

In another embodiments, the present composition can be in the form of a liquid or solid such as paste, gel, cream, ointment and the like.

Accordingly, the present invention provides a liquid composition comprising denatonium compound as aversive agent.

In one embodiment, such liquid forms of the composition include solutions, suspensions, and emulsions. These liquid preparations may further contain, in addition to the active component, colorants, flavors, stabilizers, buffers, artificial and natural bitterants, dispersants, thickeners, solubilizing agents, and the like.

The liquid composition of the present invention may further comprise actives that are soluble in water and dissolve in the aqueous medium. In the composition of the invention both suspended and any dissolved active agents are distributed homogeneously.

In some embodiments the present composition may comprise about 10 wt % to about 80 wt % of the propellant.

In some embodiments the present composition may comprise about 10 wt % to about 90 wt % of at least one water-miscible solvent selected from monohydric alcohols, polyhydric alcohols and mixtures thereof. The water-miscible solvent can be selected from methyl alcohol, ethyl alcohol, isopropyl alcohol, n-propyl alcohol, iso-butyl alcohol, sec-butyl alcohol, n-butyl alcohol, ethylene glycol, propylene glycol and mixtures thereof.

The present composition may contain irritant for example pelargonic acid morpholide, or capsicum oleoresin, or [b,f]-1,4-oxazepine (CR) dibenz, or a mixture of these irritants. Oleoresin capsicum (OS) is a natural capsaicinoid, an extract of the most burning varieties of red pepper, an irritating substance of natural origin, which is becoming increasingly popular as a means of self-defense. If it enters the mucous membrane of the eyes, nose, upper respiratory tract, it causes a short-term irritating effect in the form of lacrimation, sneezing, salivation, nasal discharge, conjunctival redness. Oleoresin capsicum is considered the safest of all used irritants. The use of OS in the liquid composition as a irritant provides a decrease in the toxicity of the composition. Pelargonic acid morpholide (IPC) is an analogue of OS, with a similar effect on the affected object. It is an oily, transparent liquid with a yellowish tint, insoluble in water, soluble in polar organic solvents (acetone, propanol, dimethylformamide, benzene, alcohols), fats (sunflower, castor oil, etc.).

Dibenz [b,f]-1,4-oxazepine (CR) is a yellow crystal that has irritating effects on the eyes, nasopharynx and skin.

The use of these substances in the liquid composition as irritants makes it possible to provide criteria for the effectiveness of the irritating effect (blepharospasm, lacrimation, etc.).

In an embodiment the present composition is aqueous composition or non-aqueous composition or a hydroalcoholic composition.

In an embodiment the present composition comprises a bittering agent and water.

In an embodiment the present composition is a suspension.

In an embodiment the present composition is a solution.

In an embodiment the present composition is a gel.

In another embodiment the present composition is a clear aqueous suspension formulation.

In one embodiment, there is provided an aqueous composition comprising denatonium compound as aversive agent.

In an embodiment, the composition is in the form of a spray.

In one embodiment, the composition is a spray comprising an aqueous suspension of aversive agent.

In one embodiment, the composition is a spray comprising an aqueous suspension of denatonium compound.

In an embodiment, denatonium compound is selected from the group comprising denatonium chloride, denatonium citrate, denatonium saccharide, denatonium carbonate, denatonium acetate, denatonium benzoate, denatonium benzoate monohydrate and mixtures thereof.

In an embodiment, denatonium salt is denatonium benzoate.

In one embodiment, there is provided an aqueous composition comprising denatonium benzoate as bittering agent and a carrier.

In one embodiment, there is provided an aqueous composition comprising denatonium compound as bittering agent for defense against attacker.

In one embodiment, there is provided an aqueous suspension comprising denatonium benzoate as bittering agent for defense against human or animal attacker.

In one embodiment, there is provided a spray comprising an aqueous composition comprising denatonium compound as bittering agent for protection against attacker.

In one embodiment, there is provided use of denatonium benzoate as bittering agent for self-defense.

In one embodiment, the present composition is a spray comprising an aqueous suspension of denatonium compound.

In one embodiment, the present composition is a spray comprising an aqueous suspension of denatonium benzoate.

The present spray comprising denatonium compound is particularly used for defense against attackers.

The present invention more particularly relates to use of denatonium compound in the present composition which may be formed into water or an aerosol or placed in a pressure sprayer to form a personal protectant for defense against attackers.

The present invention relates to a spray comprising denatonium compound used for defense.

According to an aspect of the present invention, there is provided a method of preparing a composition comprising aversive agent.

The compositions can be prepared by the convention methods known to a person skilled in the art. Typically the method of preparing the present spray composition comprises mixing the active agent with suitable carrier and stirring the mixture to obtain a clear composition ready to spray.

The composition according to the present invention may be mixed with water and sprayed on the mob. Advantageously, such spraying is also helpful in controlling riots or taming violent protest by mob. The bitterant effect of denatonium compound for example denatonium benzoate would disperse the angry mob and help control the riots or violent protest.

Preferably, the carrier is water and forms an aqueous solution containing the other ingredients.

In some embodiments, the composition comprises an oil-based carrier solution containing the ingredients is an alternative to the aqueous carrier solution.

Accordingly, the composition can comprise essential oil for example sesame oil, olive oil, corn oil, soybean oil, cottonseed oil, peanut oil, lanolin, petroleum jelly, paraffin, silicone oil, fatty acids of 6 to 30 carbon atoms or the corresponding glycerol or alcohol esters.

Alternative embodiments of the present invention provide a gel formulation comprising solid carriers containing the active ingredients. The solid carrier further contains thickening agents to provide the composition with the consistency of wax or paraffin.

In an embodiment, the concentration of the aversive agent in the compositions of the invention may vary depending on the particular bittering agent employed, and on the application for which the composition is intended, with the proviso that the concentration employed may not be toxic or below the targeted toxicity level.

In an embodiment, the composition comprises denatonium compound as aversive agent, the denatonium compound is typically present in the composition at a concentration in the range of about 0.01 to 50% wt/v, preferably 0.01 to 20% w/v, more preferably in the range of about 0.01 to 10% w/v which include 1%, 2%, 3%, 4%, 5%, 6%, 7%, 8% and 9% w/v.

The composition may be formed into an aerosol or placed in a pressure sprayer to form a personal protectant for defense against attackers.

According to another aspect of the present invention, there is provided a method of deterring an attack comprising spraying the composition at a human or animal attacker.

In an embodiment, the method of deterring human attack comprising spraying the composition comprising denatonium compound at a human attacker.

In an embodiment, the composition further comprises surfactant selected from the below list.

Anionic surfactant: sulfate, sulfonate, and phosphate, carboxylate derivatives: Anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Carboxylates are the most common surfactants and comprise the carboxylate salts (soaps), such as sodium stearate. More specialized species include sodium lauroyl sarcosinate and carboxylate-based fluorosurfactants such as perfluorononanoate, perfluorooctanoate (PFOA or PFO).

Cationic surfactant: pH-dependent primary, secondary, or tertiary amines; primary and secondary amines become positively charged at pH<10: octenidine dihydrochloride.

Permanently charged quaternary ammonium salts: cetrimonium bromide (CTAB), cetylpyridinium chloride (CPC), benzalkonium chloride (BAC), benzethonium chloride (BZT), dimethyl dioctadecyl ammonium chloride, and dioctadecyl dimethyl ammonium bromide Zwitterionic: Zwitterionic (amphoteric) surfactants have both cationic and anionic centers attached to the same molecule. The cationic part is based on primary, secondary, or tertiary amines or quaternary ammonium cations. The anionic part can be more variable and include sulfonates, as in the sultaines CHAPS (3-[(3-cholamidopropyl)dimethylammonio]-1-propanesulfonate) and cocamide. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolamine, phosphatidylcholine, and sphingomyelins.

Non-Ionic Surfactants

Non-ionic surfactants have covalently bonded oxygen-containing hydrophilic groups, which are bonded to hydrophobic parent structures. The water-solubility of the oxygen groups is the result of hydrogen bonding. Hydrogen bonding decreases with increasing temperature, and the water solubility of non-ionic surfactants therefore decreases with increasing temperature.

Ethoxylates

Fatty alcohol ethoxylate, Narrow-range ethoxylate, Octaethylene glycol monododecyl ether, Pentaethylene glycol monododecyl ether Alkylphenol Ethoxylates (APEs): Nonoxynols, Triton X-100

Fatty acid ethoxylates, Fatty acid ethoxylates are a class of very versatile surfactants, which combine in a single molecule the characteristic of a weakly anionic, pH-responsive head group with the presence of stabilizing and temperature responsive ethyleneoxide units.

Special Ethoxylated Fatty Esters and Oils

Ethoxylated amines and/or fatty acid amides: Polyethoxylated tallow amine, Cocamide monoethanolamine, Cocamide diethanolamine, Terminally blocked ethoxylate, Poloxamers Fatty Acid Esters of Polyhydroxy Compounds Fatty acid esters of glycerol: Glycerol monostearate, Glycerol monolaurate
Fatty acid esters of sorbitol
Spans: Sorbitan monolaurate, Sorbitan monostearate, Sorbitan tristearate,
Tweens: Tween 20,Tween 40,Tween 60,Tween 80

Fatty Acid Esters of Sucrose

Alkyl polyglucosides
Alkyl polyglycoside: Decyl glucoside, Lauryl glucoside, Octyl glucoside
Amine oxides: Lauryldimethylamine oxide
In some embodiments, other bitter (aversive) agents which can used in the composition either alone or in combination or the composition comprising at least one bittering agent can be prepared according to the present invention for desired purpose, include but not limited to, natural bitter substance or a member selected from the group consisting of: denatonium salts or a derivative thereof; quercetin (3,3',4',5,7-pentahydroxyflavone); Naringin (4',5,7-Trihydroxyflavanone-7-rhamnoglucoside); Aucubin; Amarogentin; Dihydrofoliamentin; Gentiopicroside; Gentiopicrin; Swertiamarin; Swerosid; Gentioflavosid; Centaurosid; Methiafolin; Harpagoside; Centapikrin; Sailicin; Kondurangin; Absinthin; Artabsin; Cnicin; Lactucin; Lactucopicrin; Salonitenolid; α-thujone; β-thujone; Desoxy Limonene; Limonin; Ichangin; iso-Obacunoic Acid; Obacunone; Obacunoic Acid; Nomilin; Ichangin; Nomilinoic acid; Marrubin; Pramarrubin; Carnosol; Carnosic acid; Quassin; Quinine hydrochloride; Quinine sulfate; Quinine dihydrochloride; Columbine; Caffeine; Threonine; Methionine; Phenylalanine; Tryptophan; Arginine; Histidine; Valine; Aspartic acid; Sucrose octaacetate; Qunine bisulfate; hop extract; and mixtures thereof.

According to the present invention a particularly preferred bittering agent is denatonium benzoate, also known as phenylmethyl-[2-[(2,6-dimethylphenyl)amino]-2-oxoethyl]-diethylammonium benzoate.

In one preferred embodiment the composition comprising denatonium benzoate as aversive agent and at least one carrier selected from polyvinylpyrrolidone, polyvinylpyridine, polyvinyl alcohol or mixtures thereof.

In one embodiment, the present invention provides use of denatonium compound for example denatonium benzoate as bittering agent for self-defense against human or animal attacker.

In another aspect of the present invention, there is provided a method of deterring a human attack comprising spraying the present composition comprising denatonium compound for example denatonium benzoate at a human attacker.

According to an embodiment of the present invention, a kit comprising stable composition according to the present invention for self-defense.

In another aspect the present invention provides a spray device comprising a composition of denatonium benzoate in an amount of less than 50% w/v.

In another aspect the present invention provides a spray device comprising a composition of denatonium benzoate in an amount of 0.01 to 50% w/v.

In another aspect the present invention provides a personal defense device carried by a user, for spraying a liquid composition comprising denatonium benzoate in an amount of 0.01 to 50% w/v.

In another aspect the present invention provides a defense spray pack comprising an aqueous composition of denatonium benzoate in an amount of 0.01 to 50% w/v and instructions manual to use the same.

In another aspect the present invention provides a defense spray pack comprising a non-aqueous composition of denatonium benzoate in an amount of 0.01 to 50% w/v.

Advantages of the Present Invention

1. The present formulation is environment friendly.
2. The present formulation doesn't cause any physical damages to skin and eyes.
3. The present product is physiochemically stable and environmentally safe.
4. The formulation also gives sustain release effect because of addition of polymers.
5. The advantage of using polymer is bitter effect remains on the surface for a longer period and hence the efficacy of the formulation is extended to a longer period.
6. The formulation has excellent spray ability.
7. The formulation has improved efficacy.

It will be understood that the specification and examples are illustrative but not limitative of the present invention and that other embodiments within the spirit and scope of the present invention will suggest themselves to those skilled in the art. Other embodiments can be practiced that are also within the scope of the present invention. The following examples illustrate the invention, but by no means intend to limit the scope of the claims.

The composition described above is safe, efficacious and stable at various temperatures, and even when the stable agrochemical composition undergoes shear forces for example on mixing.

In order that the present invention may be more readily understood, reference will now be made, by way of example, to the aforesaid description.

EXAMPLES

The compositions described in following examples were taken further to evaluate physicochemical parameters. Stability features associated with the composition developed according to the present invention were studied. It was found that all the compositions remained stable when tested at ambient conditions i.e. room temperature and pressure. The compositions also passed 0° C. and Accelerated Heat Stability (AHS) test for 14 days and remained clear and flowable suspension.

Example 1

TABLE 1

| No | Ingredients | FORMULATION 1 Qty % w/v | FORMULATION 2 Qty % w/v | FORMULATION 2 Qty % w/v | FORMULATION 3 Qty % w/v | FORMULATION 4 Qty % w/v |
|---|---|---|---|---|---|---|
| 1 | Denatonium Benzoate | 0.5 | 1 | 5 | 15 | 20 |
| 2 | Water | Quantity sufficient (q.s.) | q.s. | q.s. | q.s. | q.s. |
| 3 | Irritant (optional) Capsaicin | Not Used | Not Used | Not Used | 0.05 | Not Used |
| | OBSERVATIONS (14 days accelerated stability at 45 degrees) | | | | | |
| 1 | Appearance | Clear solution | Clear solution | Suspension | Suspension | Suspension |
| 2 | Viscosity in CPS | 1.21 cP | 1.21 cP | 1.68 | 1.79 | 1.81 |
| 3 | Specific Gravity | 1.2 | 1.2 | 1.2 | 2.1 | 2.4 |
| 4 | Observation | Clear solution | Clear solution | Sediment formation which is easily dispersible | Sediment formation which is easily dispersible | Sediment formation which is easily dispersible |
| | There is no film formation. Drug remains on the surface and can get easily rub off. | | | | | |
| | OBSERVATIONS (0 degrees/14 days) | | | | | |
| 1 | Appearance | Clear solution | Clear solution | Suspension | Suspension | Suspension |
| 2 | Viscosity in CPS | 1.74 | 1.76 | 1.56 | 1.87 | 1.87 |
| 3 | Specific Gravity | 1.87 | 1.9 | 1.8 | 2.0 | 2.7 |
| 4 | Observation | Clear solution | Clear solution | Sediment formation which is easily dispersible | Sediment formation which is easily dispersible | Sediment formation which is easily dispersible |
| | There is no film formation. Drug remains on the surface and can get easily rub off. | | | | | |
| Process of preparation | Keep required quantity of water under stirring. Add weighed quantity of denatonium Benzoate and stir. Filter if required. | | | | | |

Example 2

TABLE 2

| No | Ingredients | FORMULATION 1 Qty % w/v | FORMULATION 2 Qty % w/v | FORMULATION 3 Qty % w/v | FORMULATION 4 Qty % w/v |
|---|---|---|---|---|---|
| 1 | Denatonium Benzoate | 0.5 | 1 | 15 | 20 |
| 2 | polyvinylpyrrolidone | 0.01 | 20 | 3.5 | 5 |
| 4 | Water | q.s. | q.s. | q.s. | q.s. |
| 5 | Irritant (optional) Capsaicin | Not Used | Not Used | Not Used | Not Used |
| | OBSERVATIONS (14 days accelerated stability at 45 degrees) | | | | |
| 1 | Appearance | Clear solution | Clear solution | Suspension | Suspension |
| 2 | Viscosity in CPS | 1.21 cP | 2.81 cP | 1.68 | 1.79 |
| 3 | Specific Gravity | 1.2 | 3.3 | 1.2 | 2.1 |
| 4 | Observation | Clear solution | Clear solution | Sediment formation which is easily dispersible | Sediment formation which is easily dispersible |
| | Thin film formation with little tensile strength. | | | | |

TABLE 2-continued

| No | Ingredients | FORMULATION 1 Qty % w/v | FORMULATION 2 Qty % w/v | FORMULATION 3 Qty % w/v | FORMULATION 4 Qty % w/v |
|---|---|---|---|---|---|
| | | OBSERVATIONS (0 degrees/14 days) | | | |
| 1 | Appearance | Clear solution | Clear solution | Suspension | Suspension |
| 2 | Viscosity in CPS | 1.78 | 2.07 | 2.98 | 1.09 |
| 3 | Specific Gravity | 1.3 | 3.4 | 1.4 | 2.8 |
| 4 | Observation | Clear solution | Clear solution | Sediment formation which is easily dispersible | Thin film formation with little tensile strength. |
| | Process of preparation | Keep required quantity of water under stirring. Add weighed quantity of polyvinylpyrrolidone slowly till it forms a clear solution. Add weighed quantity of denatonium benzoate and stir. Filter if required. | | | |

Example 3

TABLE 3

| No | COMPOSITION | FORMULATION 1 Qty % w/v | FORMULATION 2 Qty % w/v | FORMULATION 3 Qty % w/v | FORMULATION 4 Qty % w/v |
|---|---|---|---|---|---|
| 1 | Denatonium Benzoate | 0.5 | 1 | 15 | 20 |
| 2 | Poly vinyl pyridine | 0.01 | 20 | 3.5 | 5 |
| 4 | Water | q.s. | q.s. | q.s. | q.s. |
| 5 | Irritant (optional) Capsaicin | Not Used | Not Used | Not Used | Not Used |
| | | OBSERVATIONS (14 days accelerated stability at 45 degrees) | | | |
| 1 | Appearance | Clear solution | Clear solution | Suspension | Suspension |
| 2 | Viscosity in CPS | 1.21 cP | 2.88 cP | 2.10 | 2.19 |
| 3 | Specific Gravity | 1.2 | 3.2 | 1.88 | 1.91 |
| 4 | Observation | Clear solution | Clear solution | Sedimentation which is easily dispersible | Sedimentation which is easily dispersible |
| | | Very thin film which releases active for at least 20-30 mins. | Film is little thicker which releases active for at least 20-30 mins. But film may crack after 10 mins or gets easily wiped off. | Very thin film which releases active for at least 20-30 mins. But film may crack after 10 mins or gets easily wiped off. | Film is little thicker least 20-30 mins. But film may crack after 10 mins or gets easily wiped off. |
| | | OBSERVATIONS (0 degrees/14 days) | | | |
| 1 | Appearance | Clear solution | Clear solution | Suspension | Suspension |
| 2 | Viscosity in CPS | 1.4 | 1.98 | 1.99 | 2.09 |
| 3 | Specific Gravity | 1.42 | 2.99 | 1.07 | 2.87 |
| 4 | Observation | Clear solution | Clear solution | Sedimentation which is easily dispersible | Sedimentation which is easily dispersible |
| | | Very thin film which releases active for at least 20-30 mins. | Film is little thicker which releases active for at least 20-30 mins. But film may crack after 10 mins or gets easily wiped off. | Very thin film which releases active for at least 20-30 mins. But film may crack after 10 mins or gets easily wiped off. | Film is little thicker least 20-30 mins. But film may crack after 10 mins or gets easily wiped off. |
| | Process of preparation | Keep required quantity of water under stirring. Add weighed quantity of polyvinylpyridine slowly till it forms a clear solution. Add weighed quantity of denatonium benzoate and stir. Filter if required. | | | |

Example 4

TABLE 4

| No | Composition | FORMULATION 1 Qty % w/v | FORMULATION 2 Qty % w/v | FORMULATION 3 Qty % w/v | FORMULATION 4 Qty % w/v |
|---|---|---|---|---|---|
| 1 | Denatonium Benzoate | 0.5 | 1 | 15 | 5 |
| 2 | Polyvinyl Alcohol | 0.01 | 1 | 3.5 | 20 |
| 3 | Water | q.s. | q.s. | q.s. | q.s. |
| 4 | Irritant (optional) Capsaicin | Not Used | Not Used | Not Used | Not Used |
| | OBSERVATIONS (14 days accelerated stability at 45 degrees) | | | | |
| 1 | Appearance | Clear solution | Clear solution | Suspension | Suspension |
| 2 | Viscosity in CPS | 1.21 cP | 1.21 cP | 1.06 cP | Very thick solution. Forms cake at the bottom |
| 3 | Specific Gravity | 1.2 | 1.2 | 3.8 | 3.9 |
| 4 | Observation | Clear solution Very thin film. Doesn't remain on surface for long time. Effective to release drug for 10-15 mins. Can get easily rubbed off. | Clear solution | Sedimentation which is easily dispersible | Sedimentation which is easily dispersible Comparatively thicker film. Doesn't remain on the surface for long time. Effective to release drug for 10-15 mins. Can get easily rubbed off. |
| | OBSERVATIONS (0 degrees/14 days) | | | | |
| 1 | Appearance | Clear solution | Clear solution | Suspension | Suspension |
| 2 | Viscosity in CPS | 2.18 | 1.21 | 1.09 | Very thick solution. |
| 3 | Specific Gravity | 1.12 | 1.56 | 3.06 | 4 |
| 4 | Observation | Clear solution Very thin film. Doesn't remain on surface for long time. Effective to release drug for 10-15 mins. Can get easily rubbed off. | Clear solution | Sedimentation which is easily dispersible | Sedimentation which is easily dispersible Comparatively thicker film. Doesn't remain on the surface for long time. Effective to release drug for 10-15 mins. Can get easily rubbed off. |
| | Process of preparation | Keep required quantity of water under stirring. Add weighed quanfty of Poly vinyl Alcohol slowly till it forms a clear/milky solution. Add weighed quantity of denatonium Benzoate and stir. Filter if required. | | | |

Example 5

TABLE 5

| No | Composition | FORMULATION 1 Qty % w/v | FORMULATION 2 Qty % w/v | FORMULATION 3 Qty % w/v | FORMULATION 4 Qty % w/v |
|---|---|---|---|---|---|
| 1 | Denatonium Benzoate | 0.5 | 10 | 15 | 20 |
| 2 | Polyvinyl Alcohol | 20 | 8 | 3 | 5 |
| 5 | Polyvinylpyridine | 0.2 | 0.2 | 0.3 | 0.2 |
| 6 | Water | q.s. | q.s. | q.s. | q.s. |
| 7 | Irritant (optional) Capsaicin | Not Used | Not Used | Not Used | Not Used |

TABLE 5-continued

| No | Composition | FORMULATION 1 Qty % w/v | FORMULATION 2 Qty % w/v | FORMULATION 3 Qty % w/v | FORMULATION 4 Qty % w/v |
|---|---|---|---|---|---|
| | | OBSERVATIONS (14 days accelerated stability at 45 degrees) | | | |
| 1 | Appearance | Clear solution | Suspension | Suspension | Suspension |
| 2 | Viscosity in CPS | 1.21 cP | 1.5 cP | 1.9 cP | 2.2 |
| 3 | Specific Gravity | 1.2 | 1.2 | 3.5 | 4.1 |
| 4 | Observations | Clear solution | Clear solution | Uniform suspension. Easily dispersible. | Uniform suspension. It settles down, but is easily re-dispersible |
| | | Uniform film formation. Film remains the surface for a long time and releases drug. If film remains on the surface, will release drug for 20-25 mins | Uniform film formation. Film remains the surface for a long time and releases drug. If film remains on the surface, will release drug for 20-25 mins | | |
| | | OBSERVATIONS (0 degrees/14 days) | | | |
| 1 | Appearance | Clear solution | Suspension | Suspension | Suspension |
| 2 | Viscosity in CPS | 2.1 | 1.45 | 1.88 | 2.20 |
| 3 | Specific Gravity | 2.22 | 1.98 | 3.89 | 3.87 |
| 4 | Observations | Clear solution | Clear solution | Uniform suspension. Easily dispersible. | Uniform suspension. It settles down, but is easily re-dispersible |
| | | Uniform film formation. Film remains the surface for a long time and releases drug. If film remains on the surface, will release drug for 20-25 mins | Uniform film formation. Film remains the surface for a long time and releases drug. If film remains on the surface, will release drug for 20-25 mins | Uniform film formation. Film remains the surface for a long time and releases drug. If film remains on the surface, will release drug for 20-25 mins | Uniform film formation. Film remains the surface for a long time and releases drug. If film remains on the surface, will release drug for 20-25 mins |
| | Process of preparation | Keep required quantity of water under stirring. Add weighed quantity of Poly vinyl Alcohol, Polyvinylpyrrolidone and Polyvinylpyridine slowly till it forms a clear/milky solution. Add weighed quantity of denatonium benzoate and stir. Filter if required. | | | |

Example 6

TABLE 6

| No | Ingredients | FORMULATION 1 Qty % w/v | FORMULATION 2 Qty % w/v | FORMULATION 3 Qty % w/v | FORMULATION 4 Qty % w/v |
|---|---|---|---|---|---|
| 1 | Denatonium Benzoate | 0.5 | 1 | 15 | 20 |
| 2 | Non aqueous Solvent (compatible and approve for human consumption) Methanol | q.s. | q.s. | q.s. | q.s. |
| 3 | Water | — | 20 | 40 | 60 |
| 4 | Irritant (optional) Capsaicin | Not Used | 0.05 | Not Used | 0.04 |
| | | OBSERVATIONS (14 days accelerated stability at 45 degrees) | | | |
| 1 | Appearance | Clear solution | Clear solution | Suspension | Suspension |
| 2 | Viscosity in CPS | 1.21 cP | 1.21 cP | 1.68 | 1.79 |

TABLE 6-continued

| No | Ingredients | FORMULATION 1 Qty % w/v | FORMULATION 2 Qty % w/v | FORMULATION 3 Qty % w/v | FORMULATION 4 Qty % w/v |
|---|---|---|---|---|---|
| 3 | Specific Gravity | 1.2 | 1.2 | 1.2 | 2.1 |
| 4 | Observation | Clear solution | Clear solution | Sediment formation which is easily dispersible | Sediment formation which is easily dispersible |
| | | There is no film formation. Drug remains on the surface and can get easily rub off. | | | |
| | | OBSERVATIONS (0 degrees/14 days) | | | |
| 1 | Appearance | Clear solution | Clear solution | Suspension | Suspension |
| 2 | Viscosity in CPS | 2.08 | 2.11 | 1.6 | 2.01 |
| 3 | Specific Gravity | 2.10 | 2.67 | 2.11 | 1.98 |
| 4 | Observation | Clear solution | Clear solution | Sediment formation which is easily dispersible | Sediment formation which is easily dispersible |
| | | There is no film formation. Drug remains on the surface and can get easily rub off. | | | |
| | Process for preparation | Keep required quantity of water under stirring. Add weighed quantity of denatonium benzoate and stir. Filter if required. (Optional: Add weighed quantity of Polyvinylalcohol, Polyvinylpyrrolidone and Polyvinylpyridine slowly till it forms a clear/milky solution.) | | | |

From the above data, it was observed that the all the compositions of the present invention are stable and effective.

The invention claimed is:

1. A composition consisting of denatonium benzoate, in an amount of from 0.5% to 20% w/v, water, and optionally capsaicin in an amount of 0.05% w/v, wherein the composition is an aqueous solution or suspension suitable for spraying as a deterrent against an attacker.

2. An aqueous composition consisting of denatonium benzoate in an amount of from 0.5% to 20% w/v, water, and a carrier selected from the group consisting of polyvinylpyrrolidone, polyvinylpyridine, and polyvinyl alcohol, wherein the composition is suitable for spraying as a deterrent against an attacker.

3. The composition of claim 2 in the form of an aqueous suspension.

4. The composition of claim 2 in the form of a spray.

5. A method of deterring an attack by a human or an animal, comprising spraying a composition onto the human or the animal, wherein said composition consists of denatonium benzoate in an amount of from 0.5% to 20% w/v, water, and optionally capsaicin in an amount of 0.05% w/v, and wherein the composition is an aqueous solution or suspension suitable for spraying as a deterrent against the human or animal attacker.

6. The method of claim 5, wherein the composition is sprayed in self-defense.

* * * * *